United States Patent [19]
Martone et al.

[11] 3,914,614
[45] Oct. 21, 1975

[54] APPARATUS AND METHOD FOR FACILITATING ALIGNMENT OF A COLLIMATOR

[75] Inventors: Ronald J. Martone, Cheshire; Samuel C. Goldman, Bethany; Roy Dewhirst, Cheshire, all of Conn.

[73] Assignee: Picker Corporation, Cleveland, Ohio

[22] Filed: June 10, 1974

[21] Appl. No.: 477,823

[52] U.S. Cl. .............................................. 250/515
[51] Int. Cl.² ........................................ G21C 11/00
[58] Field of Search ....... 33/180 R; 192/67 R, 67 P; 250/366, 367, 497, 515

[56] References Cited
UNITED STATES PATENTS

| | | | |
|---|---|---|---|
| 312,911 | 2/1885 | Simmerly | 192/67 P |
| 1,237,073 | 8/1917 | McWhirter | 192/67 R |
| 2,404,858 | 7/1946 | McLaren | 33/180 R |
| 2,968,872 | 1/1961 | Welles | 33/180 R |
| 3,011,057 | 11/1961 | Anger | 250/366 |
| 3,161,776 | 12/1964 | Moore | 250/497 |
| 3,762,068 | 10/1973 | Clay | 33/180 R |
| 3,769,509 | 10/1973 | Martone | 250/367 |

*Primary Examiner*—Harold A. Dixon
*Attorney, Agent, or Firm*—Watts, Hoffmann, Fisher & Heinke Co.

[57] ABSTRACT

Method and apparatus for alignment of a collimator in a scintillation camera system. First coarse alignment apparatus includes an alignment plunger coordinated with a first mating member. A recess coordinated with a second mating member is positioned and configured to loosely receive the alignment plunger for coarse alignment. Coarse alignment of the first apparatus establishes a vertical axis for horizontal angular rotation about which angular displacement of the members effects coarse alignment with second, coarse alignment apparatus spaced from the first apparatus. The plunger assemblies are preferably spring loaded so that an audible click is generated when the plunger impacts the bottom of the recess to indicate coarse alignment. The coarse alignment apparatus guides the two members into fine alignment whereupon tight fitting fine alignment apparatus coordinated with the two members is mated.

39 Claims, 7 Drawing Figures

U.S. Patent  Oct. 21, 1975  Sheet 1 of 2  3,914,614
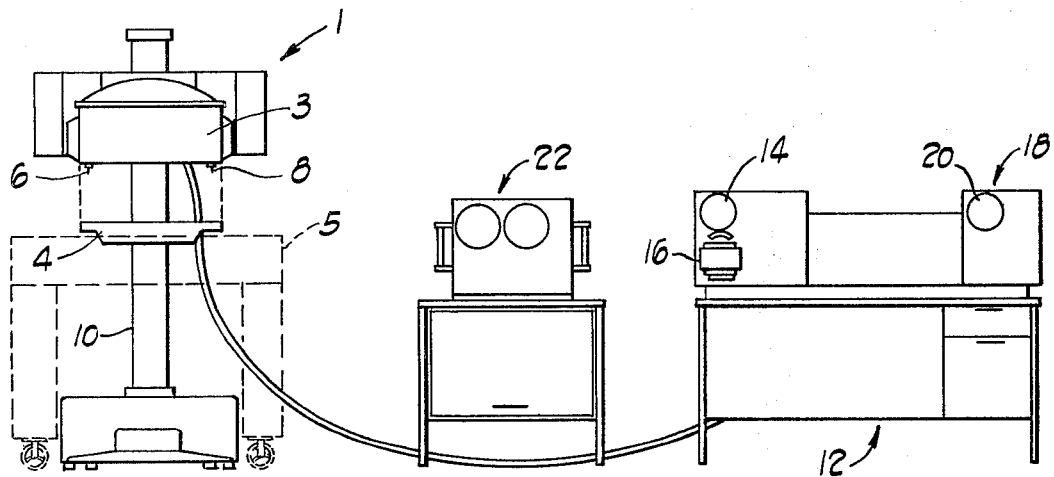
Fig. 1
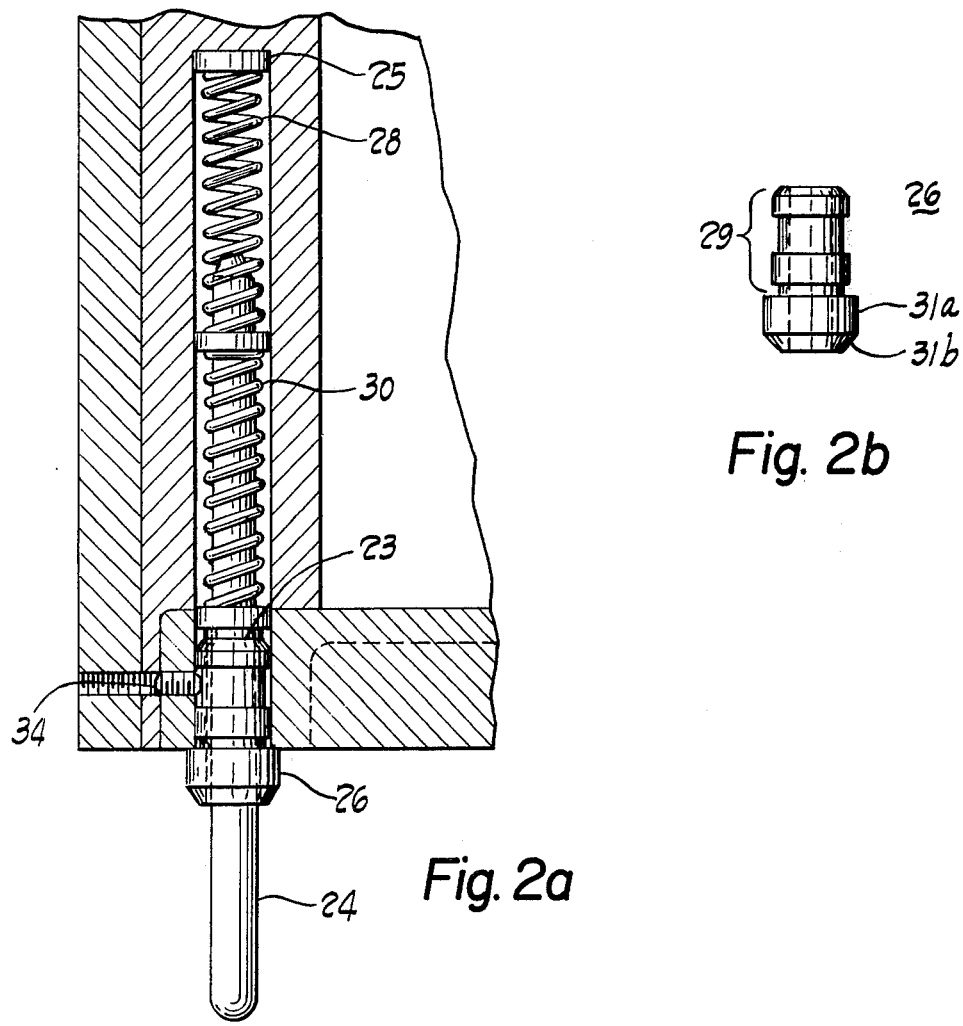
Fig. 2a
Fig. 2b

APPARATUS AND METHOD FOR FACILITATING ALIGNMENT OF A COLLIMATOR

BACKGROUND OF THE INVENTION

1. Field of the Invention

The present invention relates to alignment apparatus in general and more particularly to detents for aligning and mating collimator and a scintillation camera.

2. The Prior Art

In the diagnosis of certain illnesses, radioactive agents are administered to patients. These administered agents have the characteristics of localizing to a greater or lesser degree in certain tissues. For example, iodine 131 localizes in thyroid glands. A presentation of the spacial distribution and concentration of administered iodine 131 in a thyroid gland provides by scintillation scanning an image of the gland itself. The image is useful in diagnosing the condition of the gland.

In a somewhat similar manner technetium, an element obtained by the irradiation of molybdenum with deuterons, is an element commonly utilized in brain studies. In studying the effect of administered radiation on various organs, scintigrams are frequently generated using scintillator cameras.

In many of these cameras, a relatively large disc-shaped scintillation crystal is positioned to be stimulated by the radiation emitted from the patient. In most cameras a collimator is interposed between the patient and the crystal for absorbing unwanted radiation and permitting desired rays to strike the crystal.

Depending upon the particular study, the administrator must choose the appropriate collimator and perhaps exchange it with the presently attached collimator. For example, if a thyroid study or a static whole body study is to be performed, typically a pin-hole type collimator will be selected. Conversely, if a brain study is to be performed, a parallel hole type collimator of the appropriate dimensions will be selected. Resulting collimator exchanges may be necessitated several times a day during the normal routine of hospital affairs.

Historically, such collimator exchanges have been troublesome. A collimator typically weighs between 100 and 300 pounds and additionally is quite bulky. One present method for aligning the scintillator camera and the collimator includes mounting the particular collimator on a cart with its face downward and positioning the cart to directly underlie the camera head. The cart is then maneuvered directly into fine alignment, necessitating engagement of sturdy metal alignment pins in the camera head with corresponding tight fitting holes in the collimator. Because of the relative bulk of the camera and the collimator compared with the small alignment pins, vision is obscured, and alignment is burdensome. Furthermore, the collimator is heavy, and the repeated precise motion of the collimator on its cart is a strenuous task for the involved technician.

Another proposed method uses longer pins and thereby facilitates visualization of the mounting. Such has proven an undesirable alternative as generally the collimator requires thinness in the region of the mounting pins.

Proposals have been suggested for x-ray apparatus whereby spring biased balls are utilized as a detent. Such proposals have not proven to be the solution as fine alignment is still initially required, and the inherent problems remain. Furthermore the proposals using such spring biased balls did not contemplate mating two relatively heavy and massive members, as is the case in certain radiation imaging systems, such as in gamma camera systems.

Still another proposed method requires storing the extra collimators in fixed relation to the detector to eliminate one or more degrees of freedom during alignment: for example, in a ring stand having its axis fixed parallel to the detector axis. The drawbacks here include: 1) the limitation placed on utilization of valuable floorspace, 2) the relatively complex and sturdy mechanism to support a plurality of collimators, 3) the structure and unused collimators may interfere with a study and, 4) a collimator cannot readily be used on another camera.

SUMMARY OF THE INVENTION

The present invention overcomes the foregoing and other drawbacks of the prior art by providing alignment apparatus including a plunger coordinated with one of the mating members and extending in the direction of alignment. The second mating member has a recess coordinated therewith which is positioned and configured to loosely receive the plunger for coarse alignment. To effect fine alignment, tight fitting fine alignment apparatus coordinated with the members is urged into joinder under constraints of the coarse alignment apparatus.

In a preferred embodiment, one member has a pair of spaced plungers each plunger having a circumscribing collar, or sleeve, adjacent the member. The other mating member has a pair of recesses spaced and positioned to loosely receive the rods and to tightly receive the collars. Each recess in the second member includes an upper side portion tapered to an inward perimeter from the surface, and a lower side portion extending substantially untapered from the inward perimeter for precisely receiving the tight fitting collar. The collar preferably comprises a substantially cylindrical portion adjacent the first member and a tapered remote portion, whereby the members are urged into fine alignment by force against the respective tapered surfaces.

The method according to this invention includes a multistep sequence of initially establishing a vertical axis about a first coarse point of alignment between the two mating members, then angularly displacing a member into coarse rotational alignment, and then maneuvering the members into fine alignment under the constraints of coarse alignment.

One feature of the detent according to the invention is that the plunger making primary contact with its mating recess has an extended length greater than the other plunger. The added length enhances viewing of the process for facilitating alignment, and the retractible nature of the plunger retains use of the desirably shallow recess.

Another feature of the invention is spring actuated plungers of sufficient strength such that an audible indication is generated when coarse alignment is achieved, i.e., when the plunger initially is received by the respective recess.

As will be apparent from the foregoing summary, it is a general object of the present invention to provide novel and improved aligning and detent apparatus in radiation imaging systems. A more specific object of the invention is to provide alignment apparatus and method for initially coarse aligning the system and then fine aligning the system, while using standard positioning servomechanisms.

Other objects and advantages will become apparent from the following detailed description of the invention when referring to the accompanying drawings.

BRIEF DESCRIPTION OF THE DRAWINGS

FIG. 1 depicts one radiaton imaging system featuring the invention;

FIG. 2a is a cross-sectional cut-away view of a preferred detent assembly used in this invention;

FIG. 2b depicts a preferred collar assembly shown in the detent of FIG. 2a;

DETAILED DESCRIPTION OF THE PREFERRED EMBODIMENT

Figure 3A:
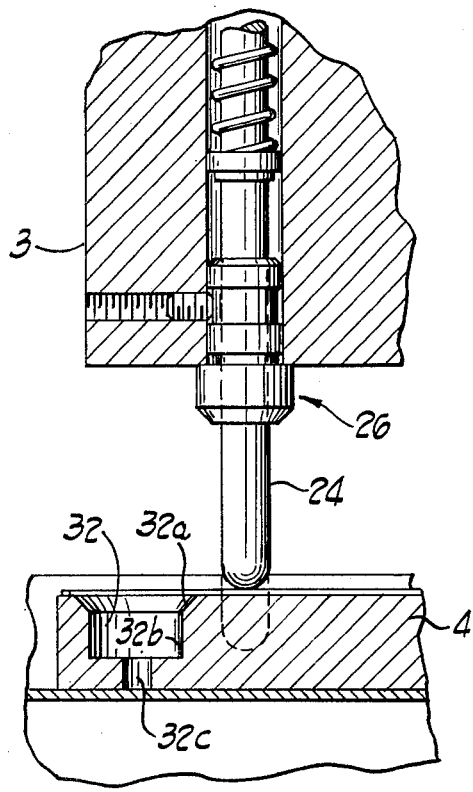
FIG. 3a–3d depict stages of alignment showing the relationship of the members and alignment apparatus.

Referring now to FIG. 1, a radiation detector assembly is shown generally at 1 comprising a collimator 4, detents 6 and 8, detector head 3, and support means 11. Collimator 4 is shown cradled in cart 5 positioned under the detector head 3 to which it is normally affixed. Detent assemblies 6 and 8 are provided for aligning the collimator 4 with the detector head 3, as will be explained.

During a particular aligning and mounting process, the collimator 4 resides face down on cart 5 positioned underneath the overhanging detector head 3. The head is adjustably mounted on stand 11 and is lowered therealong during the alignment process until the head 3 engages the collimator 4.

After mounting of the collimator 4 on the head 3, the head and collimator are positioned adjacent the patient or other subject under study for data generation and processing. Electrical signals from the head 3 are conducted to circuitry contained within a console shown generally at 12. After processing, the signals provide an image on a monitor oscilloscope 14 depicting the distribution of an isotope in the subject under investigation. A duplicate image may be produced on a camera oscilloscope, not shown, which is viewed and photographed by a camera 16.

Console 12 circuitry processes the data and generates analog signals in a manner now well known in the art. Assuming that the analog signals represent photopeak events, they are digitized. The digital signals may be fed to an offline computer for analysis and diagnosis. The digital information may alternatively be fed to a built-in digital data processor 18. This processor utilizes the digital information to generate either a variable width profile histogram of counts versus horizontal distance or a histogram of counts versus time. Such histograms are displayed on a monitor 20. The digital information may also be fed to a tape recording storage console shown generally at 22 for later use. The digital information is reconstructed to analog to produce the images displayed on the monitor oscilloscope 14 and recorded by the camera 16.

Referring now to FIG. 2a, there is shown in detail a preferred embodiment of one of the detent assemblies 6 or 8 secured in coordination with the first member. A plunger assembly comprises a rod 24, such as a dowel, slidably secured within chamber 25 through a sleeve such as collar 26. First and second springs 28 and 30 respectively are serially connected to the rod 24 for urging it into its fully extended position in the direction of alignment. A snap ring 23 is affixed to the rod 24 against which spring 30 interacts. As rod 24 is depressed inwardly, spacer 32 compresses springs 28 and 30. As will subsequently be explained in greater detail, springs 28 and 30 are preferably of sufficient strength to force a collision between the partially compressed rod 24 and its corresponding mating member to produce an audible indication thereof, which will be an indication of coarse alignment. The collar 26 retains the snap ring 23 during travel of the rod 24 and the collar is secured to the first mating member by an inset screw 34.

The collar or sleeve 26 as shown in FIG. 2a is reproduced in FIG. 2b for better understanding of the preferred detent embodiment. A portion 29 of the collar 26 is adapted to be inserted into the first mating member while a second portion 31 is secured adjacent the mating edge of the first member. In the preferred embodiment portion 31 is comprised of an upper cylindrical portion 31a adjacent the mating surface of the first member and a lower beveled portion 31b remote from the mating surface. As will henceforth be explained beveled portion 31b facilitates fine alignment by guiding the mating members into engagement and minimizes collision shock.

FIGS. 3a–3d show an alignment sequence depicting the relationship between the mating members and the preferred embodiment of the detent assembly of FIG. 2. Although only a single detent assembly is shown in FIGS. 3a–3d, the preferred embodiment utilizes a pair of detent assemblies as will be apparent during description of the alignment process.

FIG. 3a shows a preferred configuration of an accepting means 32 for the plunger assembly. Recess 32 positioned in coordination with the other mating member is configured such that rod 24 is loosely captured thereby to define coarse alignment between those points. Recess 32 is also configured to receive collar 26 in tight fitting engagement to effect fine alignment. It is seen that the preferred embodiment recess 32 comprises three portions, an upper beveled portion 32a extending from the mating surface to an inward perimeter. Surface 32b extends from the inward perimeter substantially untapered and is of a configuration to receive portion 31a of the collar assembly 26. Recess 32 is further comprised of a cavity 32c substantially centered in the bottom boundary having its primary function during fabrication and not alignment.

For convenience it is assumed that the first member to be mated is a detector head 3, and the second member to be mated is a collimator 4 underlying head 3 as shown in FIG. 1. FIGS. 3 accordingly depict a preferred sequence wherein the detector head 3 is lowered substantially vertically along stand 11 to the underlying collimator 4 positioned on a cart 5. As the detector head 3 is lowered, the technician performing the aligning and mounting task visually observes the relative position of the rod 24 and the recess 32. If the detector head is lowered so as to cause sufficient retraction of the rod 24, an audible indication will be generated when the rod 24 slips into recess 32 into coarse alignment. That is, rod 24 slips from surface 32a and impacts the bottom boundary of the recess with the force stored in the compressed springs 28, 30. This step is exemplified in FIG. 3b wherein the rod 24 has slipped from the beveled side 32a of the recess and is traveling towards the bottom boundary thereof.

Figure 3B:
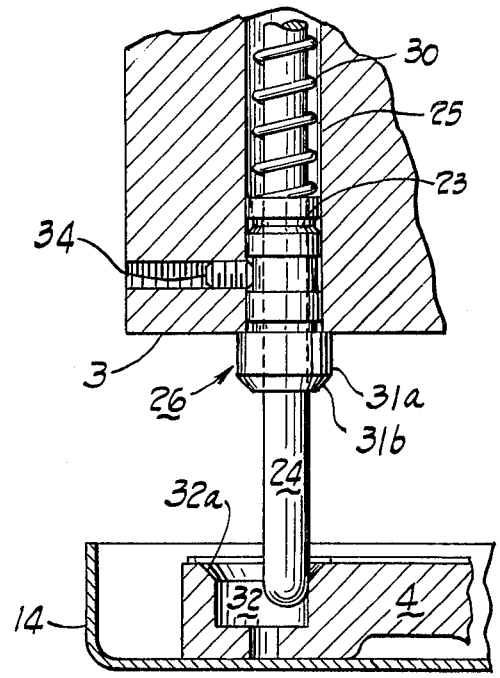
Figure 3C:
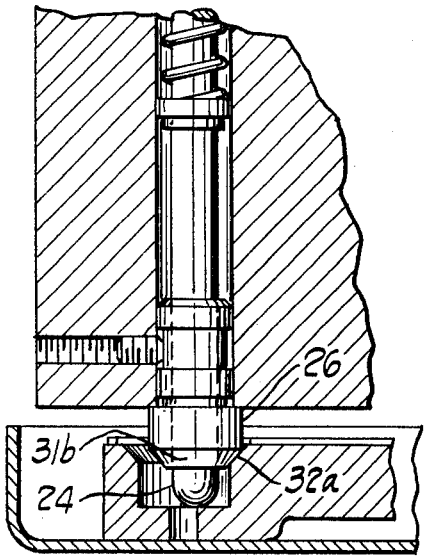
Figure 3D:
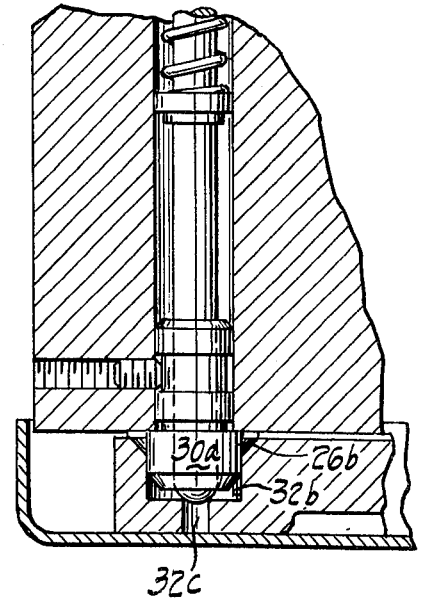

FIG. 3c depicts the stage of coarse alignment between the two specific points as the rod 24 has been captured by the recess 32. The first member and collar 26 have been brought adjacent the second member. in this coarse alignment configuration, the lower tapered portion 31b of the collar assembly 26 resides against the upper tapered portion 32a of the recess. After slight additional manipulation, the two members to be mated are brought into fine alignment as shown in FIG. 3d. Typically, weight of the detector head 3 generates sufficient force in the direction transverse to alignment to urge the members into fine alignment with little additional manipulation of the collimator.

FIG. 3d depicts fine alignment between the first and second mating members. The lower boundary portion 32b of the recess 32 fully and precisely receives the upper contoured portion 31a of the collar 26. The collar portion 31b must be received by recess portion 32b in tight fitting joinder to assure accurate alignment. The two members are thus in a contiguous and abutting relationship and are positioned to be fastened together.

It will be understood that the above specifically described embodiment is a preferred embodiment and is not to be construed in a limiting fashion. As will be apparent from subsequent description, apparatus according to the preferred embodiment incorporates another alignment plunger assembly and corresponding recess 32 which are diametrically spaced therefrom and coordinated with the second mating member as depicted in FIG. 1. The first coarsely aligned plunger assembly establishes an axis of rotation so that the second plunger assembly will function as a rotational detent. This will be explained in detail subsequently with respect to the method of this invention.

Although the plunger assemblies are herein depicted as physically part of the mating members, it is understood that they may be associated with apparatus in fixed physical relationship to the particular member, such as the collimator cart 5. Further, the relative position of the extending plungers between the mating members may be reversed; i.e., the plunger assemblies may extend from the collimator surface toward the camera head. Still further, one plunger assembly and its recess may be reversed with one plunger assembly on one member and the other plunger assembly on the other member. Yet further the tight fitting means for effecting fine alignment need not circumvent the plunger, as the collar or other protrusion and its receiving part may be spaced from the plunger/recess combination in a known relationship. All such configurations and combinations thereof providing a first coarse alignment position and a second fine alignment position are understood to be within the scope of this invention.

The method of aligning two members according to this invention is best illustrated when referring to the detent assemblies 6 and 8 in FIG. 1 in combination with the sequence of FIGS. 3a–3d. For facilitating understanding of the method of alignment according to this invention, the first member will again be described as the camera head 3, and the second member will be described as the collimator 4 in FIG. 1. However it is understood that other mating apparatus in the radiation imaging art may suitably utilize techniques herein described, and that such members need not necessarily be initially in the overlying positional relationship of FIG. 1.

The detent assembly shown in FIG. 3a is initially considered to represent one of the detent assemblies shown in FIG. 1, such as detent 6. In a preferred embodiment, one of the plungers extends a length greater than the other of the plungers from the head 3, and the plunger having the longer length is selected initially. The head 3 is initially lowered towards the collimator until the rod 24 begins to depress, usually in a position proximate to the recess 32 but in somewhat misalignment. By choosing the long detent for initial gross alignment, the technician readily observes the relative positions of the rod 24 and the recess 32 during lowering of the head and maneuvers the collimator on its cart into rough alignment as shown in FIG. 3b. The plunger 24 during coarse alignment fully extends to the bottom boundary of the recess 32 as shown in FIG. 3c. Such coarse alignment establishes by way of the plunger 24 a vertical axis for horizontal rotational displacement of the members for subsequently aligning the diametrically opposed detent.

During lowering of the head 3 into coarse alignment, the diametrically opposed plunger assembly is compressed in a manner similar to that of the first plunger assembly. To show this, the sequence of FIGS. 3 is considered to represent the diametrically opposed detent during coarse alignment. The relative distance between the members as shown in FIG. 3a during coarse alignment is exaggerated. FIG. 3b represents the result of the step of angularly displacing the two members in the right-to-left direction about the vertical axis provided by the first plunger assembly.

FIG. 3b thus represents coarse rotational and linear alignment of the system immediately following the audible click produced by rod 24 forcefully contacting the bottom of the recess, or by the snap ring 23 striking the collar 26.

FIG. 3c depicts the subsequent steps of bringing the two members into closer proximity such that the beveled surfaces of the collar contacts the recess. In this position, the technician needs at most only slight jockeying of the cart and collimator to bring the head into fine alignment, as the beveled surfaces provide a force vector tending to align the members as the head is further lowered toward the collimator.

It thus is apparent that a novel and improved method of alignment has been described wherein initially a vertical axis is established between the two mating members at points of coarse alignment, and then the members are angularly displaced such that a diagonally opposed detent assembly and recess is also brought into coarse alignment. An audible clicking sound is generated by a spring loaded plunger snapping into the bottom of the recess. The second phase of fine alignment phase is then readily effected by slight pressure in the direction of alignment, such as by continued lowering of the camera head.

It will be appreciated that when modifying the structural relationship of the detent assemblies as above suggested, the specific step according to the method will also be modified. For example, if the collar or tight fitting means is spaced from the plunger assembly, after initially coarse aligning the first plunger assembly, the step of angularly displacing the members may substantially simultaneously effect coarse alignment and fine alignment.

Although the invention has been described in its preferred form with a certain degree of particularity, it is understood that the present disclosure of the preferred form has been only by way of example. Numerous changes in the details of construction and the combination and arrangements of parts, especially in the relative detent assembly locations, may be altered without departing from the spirit and scope of the invention as hereinafter claimed.

What is claimed is:

1. Alignment apparatus in a radiation imaging system for aligning first and second mating members comprising:
   a. alignment plunger means including a plunger rod extending along the axis of alignment in association with the first member and means for retractably urging the rod into an extended position;
   b. protruding means associated with said first member and with said rod said protruding means extending in the direction of alignment; and,
   c. said second member having means associated therewith, including a recess, positioned and configured to recieve said rod, said recess having an upper side boundary tapered from the surface of the second member to an inward perimeter, and a lower side boundary extending substantially untapered from said inward perimeter for receiving said protruding means.

2. The alignment apparatus according to claim 1 wherein said lower side boundary is cylindrically configured and said protruding means is comprised of a cylindrical portion adjacent said first member and a tapered lower portion remote therefrom.

3. The alignment apparatus according to claim 2 and further including:
   a. at least another plunger means having another rod slidably contained by and extending from one of said members in the direction of alignment, said another plunger means spaced from said alignment plunger means;
   b. collar means circumscribing said at least another rod and coupled to said one member; and,
   c. the other of said members having at least another recess therein positioned and configured to receive said at least another rod.

4. The alignment apparatus according to claim 3 wherein said one member is said first member and said other member is said second member.

5. The alignment apparatus accordiing to claim 4 wherein said second member further has a cavity substantially centered in said bottom side portion of said recess for receiving said rod when said lower side portion receives said collar means.

6. The alignment apparatus according to claim 5 wherein said rod includes a tapered end portion and said cavity mates said tapered end portion during alignment.

7. The alignment apparatus according to claim 3 wherein said rod of said alignment plunger means extends to a first uncompressed length from said first member and said another rod extends a noncompressed length less than said first length from said first member.

8. The alignment apparatus according to claim 7 wherein said radiation imaging system is a scintillation camera system, said first member comprises a gamma ray detector and said second member comprises a collimator.

9. Alignment apparatus in a radiation imaging system for aligning first and second mating members comprising:
   a. alignment plunger means including a plunger rod extending along the axis of the alignment in association with the first member;
   b. protruding means associated with said first member and with said rod extending in the direction of alignment;
   c. said second member having means associated therewith, including a recess, positioned and configured to receive said rod;
   d. means for retractably urging the rod into an extended position; and,
   e. a stop member secured to the rod, said urging means having sufficient strength to effect an audible impact between the stop member and the protruding means, whereby at a first stage of alignment the rod resides on the second member and at a second stage of alignment is caused to extend by the urging means.

10. Alignment apparatus for aligning first and second mating members, the first and second members having respective first and second mating surfaces, comprising:
    a. alignment plunger means including a plunger rod secured in relative extension between the first member and the second member;
    b. protruding means associated with said plunger rod and secured in relative extension between said members; and,
    c. said members having receptable means positioned and configured to loosely receive said rod and to tightly receive said protruding means to allow mating of said surfaces.

11. The alignment apparatus according to claim 10 wherein said alignment plunger means further includes means for retractably urging said rod into an extended position and said receptable means is a recess which defines upper and bottom boundaries.

12. The alignment apparatus according to claim 11 wherein said protruding means comprises a collar means circumscribing said plunger rod, and said recess is configured to tightly receive said collar means within said upper boundary when said members are finely aligned and said surfaces mate.

13. The alignment apparatus according to claim 12 wherein said retractable urging means has sufficient strength to effect an audible impact between said rod and the bottom boundary of said recess during the alignment process, wherein at a first stage of alignment said rod is loosely received by said recess and at a second stage of alignment, said rod audibly engages said bottom boundary.

14. The alignment apparatus according to claim 13 wherein said rod is comprised of a substantially cylindrical portion and a tapered end portion, said protruding means includes a collar encircling a cylindrical portion of the extended rod.

15. The alignment apparatus according to claim 12 wherein said protruding means and said plunger means are affixed to said first member, and said recess is in said second member.

16. The alignment apparatus according to claim 15 wherein said means for retractably urging includes a spring.

17. A method of aligning first and second mating members in a radiation imaging system comprising the steps of:
a. positioning the members in relative proximity;
b. relatively maneuvering the members until first points associated with the respective members are in coarse alignment;
c. constraining the members to allow substantially only relative rotational movement, thereby establishing an axis of rotation between said members;
d. relatively angularly displacing said members about said axis until second points associated with the respective members are in coarse alignment, thereby effecting coarse alignment of said members.

18. A method of aligning according to claim 17 and further including the step of rigidly securing said first and second members.

19. A method of aligning according to claim 18 and including prior to said step of rigidly securing the step of finely maneuvering said members into mating engagement.

20. A method of aligning according to claim 19 wherein said step of constraining the members comprises the step of positioning a first protruding element extending from one member into a first relatively large cooperating recess in the other member.

21. A method of aligning according to claim 20 wherein said step of angularly displacing comprises the step of angularly displacing said members until a second protruding element is positioned into a second relatively large cooperating recess.

22. A method of aligning according to claim 21 wherein said step of finely maneuvering includes the steps of positioning a third protruding element into and in tight engagement with the first recess, and positioning a fourth protruding element into and in tight engagement with the second recess.

23. A method of aligning according to claim 22 wherein the step of constraining the members comprises the step of positioning a first relatively long protruding element extending from one member into a first relatively large cooperating recess in the other member, and said step of relatively angularly displacing includes the step of positioning.

24. A method of aligning according to claim 20 wherein the first protruding element is slidable within the one member and is forcefully urged into an extended position and
a. said step of relatively maneuvering comprises the step of at least partially urging the element to less than an extended position; and,
b. the step of constraining includes the step of generating an audible indication when the element is in the recess.

25. A method of aligning according to claim 24 wherein said first and second members are respectively radiation detector means and collimator means with said radiation detector means spaced from and substantially overlying said collimator means, and said step of positioning includes the step of lowering said radiation detector means into mating contact with said collimator means.

26. A radiation detector assembly having a radiation detector head, a collimator mating with the detector head, and alignment apparatus for aligning the detector head and the collimator and allowing their mating, the alignment apparatus comprising:

a. alignment plunger means including a plunger rod secured in relative extension along the axis of alignment between the detector head and the collimator;
b. protruding means coordinated with said plunger rod and secured in relative position along the axis of alignment between the detector head and the collimator; and,
c. receptacle means positioned and configured to loosely receive said plunger rod to tightly receive said protruding means to allow mating of the detector head and the collimator.

27. The radiation detector assembly according to claim 26 wherein the protruding means is a collar circumscribing the plunger means.

28. The radiation detector assembly according to claim 27 wherein the receptacle means is a recess configured to tightly receive the collar.

29. The radiation detector assembly according to claim 28 wherein the recess has a bottom boundary, and further including spring means for audibly urging the plunger rod against the bottom boundary as an indication of coarse alignment.

30. The radiation detector assembly according to claim 27 and further including another said alignment apparatus to provide first and second fixedly spaced alignment apparatus.

31. The radiation detector assembly according to claim 27 and further including a cart for movably supporting said collimator proximate said radiation detector head.

32. A method of aligning a radiation detector head and a collimator in a radiation imaging system comprising the steps of:
a. coarsely maneuvering the collimator in relative proximity to the radiation detector head;
b. loosely constraining first points respectively located on the detector head and the collimator into coarse alignment, thereby establishing an axis of rotation between the detector head and the collimator;
c. relatively angularly displacing the detector head and the collimator about said axis until second points respectively located on the detector head and the collimator are positioned in coarse alignment; and,
d. relatively finely maneuvering the detector head and the collimator until the first and second points are respectively positioned in fine alignment to allow mating of the detector head and the collimator.

33. The method of aligning according to claim 32 and including, prior to the step of relatively finely maneuvering, the step of loosely constraining the second points in coarse alignment.

34. The method of aligning according to claim 33 wherein the steps of loosely constraining each respectively include the step of capturing a portion of a fixedly located protruding element extending relatively between the detector head and the collimator with a corresponding receptacle of size more than slightly larger than the protruding element.

35. The method of aligning according to claim 34 wherein the step of relatively finely maneuvering includes the step of capturing another portion of the respective protruding elements with the corresponding receptacles, said another portion having a size only slightly smaller than the respective receptacle.

36. Alignment apparatus in combination with a radiation detector assembly and a radiation collimator assembly, the assemblies having mating surfaces, comprising:
   a. first and second spaced alignment plunger means fixedly associated with the assemblies;
   b. each plunger means having a relatively large portion and a relatively small portion extending along the axis of alignment between the assemblies; and
   c. said assemblies having first and second associated receptacle means spaced in coordination with and to receive the respective plunger means when the assemblies are aligned and in engagement, each receptacle means configured to receive the respective small portion when the assemblies are in coarse alignment, and configured to receive the respective large portion when the assemblies are finely aligned and able to be engaged.

37. The method of connecting a collimator assembly to a detector assembly comprising:
   a. manipulating the two assemblies relatively until a projection on one assembly fits loosely into a recess on the other assembly and the assemblies are still in spaced relationship;
   b. rotating the assemblies relatively about a pivot established by the coaction of the projection and walls of the recess until the assemblies are substantially aligned; and,
   c. bringing the two assemblies together while concurrently causing camming surfaces to precisely align the two assemblies.

38. In combination with a scintillation camera including detector head and collimator assemblies an improved assembly alignment mechanism comprising:
   a. said assemblies having mating surfaces;
   b. one of the assemblies having a recess extending transversely of and communicating with the mating surface of the one assembly;
   c. said recess including a portion adjacent the mating surface of the one assembly, the portion having a transverse dimension substantially greater than the projection whereby the projection is initially loosely received in said recess; and,
   d. said assemblies including coacting surfaces near said projection for precisely aligning the two assemblies when they are connected together.

39. In combination with a scintillation camera including detector head and collimator assemblies an improved assembly alignment mechanism comprising:
   a. said assemblies having mating surfaces and aligned recesses extending transversely of and communicating with the surfaces;
   b. a reciprocable plunger mounted in one of the recesses and projecting into the other recess;
   c. said other recess including a portion adjacent the mating surface of the same assembly, the portion having a transverse dimension substantially greater than the plunger whereby the plunger is initially loosely received in said other recess; and,
   d. said assemblies including coacting surfaces near said plunger for precisely aligning the two assemblies when they are connected together.

* * * * *